United States Patent [19]
Boyle et al.

[11] Patent Number: 6,099,580
[45] Date of Patent: Aug. 8, 2000

[54] METHOD FOR PROVIDING PERFORMANCE-DRIVEN LOGIC OPTIMIZATION IN AN INTEGRATED CIRCUIT LAYOUT DESIGN

[75] Inventors: Douglas B. Boyle, Palo Alto; James S. Koford, San Jose, both of Calif.

[73] Assignee: Monterey Design Systems, Inc., Sunnyvale, Calif.

[21] Appl. No.: 09/021,973

[22] Filed: Feb. 11, 1998

[51] Int. Cl.$^7$ ..................................................... G06F 17/50
[52] U.S. Cl. ..................................................... 716/7; 716/8
[58] Field of Search ..................... 395/500.08, 500.09, 395/500.1, 500.11, 500.12; 716/7, 8

[56] References Cited

U.S. PATENT DOCUMENTS

| | | | |
|---|---|---|---|
| 5,495,419 | 2/1996 | Rostoker et al. | 700/121 |
| 5,526,517 | 6/1996 | Jones et al. | 707/8 |
| 5,875,117 | 2/1999 | Jones et al. | 716/14 |
| 5,909,376 | 6/1999 | Scepanovic et al. | 716/8 |
| 5,914,887 | 6/1999 | Scepanovic et al. | 716/8 |

FOREIGN PATENT DOCUMENTS 0 463 301 A2  1/1992  European Pat. Off. .

OTHER PUBLICATIONS

Sato et al "Post–Layout Optimization for Deep Submicron Design," ACM, Jan. 1996, pp. 1–6.

Kannan et al "A Methodoligy and Algorithms for Post–Placement Delay Optimization," ACM/IEEE, 1994, pp. 327–332.

Chandrasekhar et al "Effective Coupling Between Logic Synthesis and Layout Tools for Synthesis..Circuits," VLSI Design, 1997, vol. 5, No. 2, pp. 125–140.

Wiederhold et al "Deep–Submicron ASIC Design Requires Design Planning," EDN, Feb. 1995, pp. 95–100.

*Primary Examiner*—Paul R. Lintz
*Assistant Examiner*—Vuthe Siek
*Attorney, Agent, or Firm*—Skjerven, Morrill, MacPherson, Franklin & Friel LLP; Edward C. Kwok

[57] ABSTRACT

A method for optimizing layout design using logical and physical information performs placement, logic optimization and routing and routing estimates concurrently. In one embodiment, circuit elements of the integrated circuit is partitioned into clusters. The clusters are then placed and routed by iterating over an inner-loop and an outer-loop according to cost functions in the placement model which takes into consideration interconnect wiring delays. Iterating over the inner-loop, logic optimization steps improves the cost functions of the layout design. Iterating over the outer-loop, the size of the clusters, hence the granularity of the placement, is refined until the level of individual cells is reached. The present method is especially suited for parallel processing by multiple central processing units accessing a shared memory containing the design data base.

39 Claims, 6 Drawing Sheets

METHOD FOR PROVIDING PERFORMANCE-DRIVEN LOGIC OPTIMIZATION IN AN INTEGRATED CIRCUIT LAYOUT DESIGN

BACKGROUND OF THE INVENTION

1. Field of the Invention

The present invention relates to integrated circuit physical design automation. In particular, the present invention relates to an automated method and system for providing a physical design of an integrated circuit that is optimized for meeting power and interconnect-dominant timing requirements.

2. Discussion of the Related Art

Existing top-down design methods focus on optimizing transistors and gates, and model interconnect lines as merely "parasitic" elements of these transistors and gates. Implicit in this view of interconnect lines is the assumption that wiring delays and congestion in the interconnect lines are secondary to transistors and gates, and therefore can be taken into account as corrections to the timing and density models of the transistor and gates. As feature sizes of integrated circuits continue to shrink, this assumption is clearly no longer valid. In fact, interconnect is expected to dominate both performance and density in the near future.

FIG. 1 shows a typical existing design method 100. As shown in FIG. 1, an integrated circuit design is captured by a design entry step 101. Design entry step 101 is typically facilitated by a design capture system allowing the user to specify the logic design of the integrated circuit graphically, through a hardware description language (e.g., VHDL), or both. Typically, at design entry step 101, the user need not specify all elements of the design at the logic gate level. Many elements can be specified at a higher functional level (e.g., register-transfer level).

Upon completion of design entry step 101, a functional simulation step 102 is typically carried out using a functional simulator to verify functional behavior of the design. Based on a verified functional level description ("functional design"), the functional design can then be synthesized to the logic gate level in logic synthesis step 104, using a logic synthesis tool. Typically, at logic synthesis step 104, additional circuits for diagnostic and test purposes are included to provide a synthesized logic circuit ("gate-level design"). Such additional circuits may include, for example, test circuits for a boundary scan design under the JTAG standard.

Using the gate-level design, an initial circuit partitioning can be performed, i.e., floor planning step 103, to allow a first estimate of circuit size and to group highly connected portions of the design together to facilitate a subsequent layout step. In addition, a logic simulation (simulation step 109) and a static timing analysis (timing analysis step 108) are performed on the gate-level design to verify the gate-level design's functional behavior, and to extract estimates of timing parameters.

During this time, at formal verification step 107 and test structure verification step 106, the gate-level design is verified against both the functional design and a behavior description of the additional included circuits to ensure both the functional design's and the test structure's behaviors are preserved. Further, the gate-level design is also checked, at technology checking step 105, that technology-specific logic design rules are not violated.

The gate-level design, together with timing information from the static timing analysis, are integrated into a pre-layout design database in front-end processing step 110. At this time, a pre-layout signoff step 111 signifies the beginning of the physical realization phase of the integrated circuit design. FIG. 1 shows a layout step 112 in which the physical realization ("layout") is created by performing a number of tasks ("layout design tasks") iteratively.

Typically, layout design tasks include, generally, the steps of circuit partitioning, placement and routing. As mentioned above, an initial circuit partition based on the gate-level design is already provided at floor-planning step 103. Based on this initial partition, the circuit partitioning step in layout step 112 further refines circuit partitions down to the level of individual "cells" (e.g., logic gates or macro cells). These cells are then placed according to some constraints, which are typically expressed by a cost function. Typical constraints relate to area, power and local timing. The cells so placed are then routed to provide the necessary interconnect. The routing is also typically performed according to certain constraints, such as local timing and power constraints.

In the prior art, a final static timing analysis step 113 is then performed on the routed layout design, incorporating into the timing information delays introduced by the routing step. If final static timing analysis step 113 uncovers timing problems in some signal paths, an optimization cycle is initiated by flagging the gates along the problematic signal paths and returning the gate-level design back to logic synthesis step 104. In logic synthesis step 104, logic synthesis techniques are applied to improve the gate-level design in a revised gate-level design. Steps 105–113 are then repeated on the revised gate-level design. This optimization cycle is repeated until all timing problems are resolved, represented by the post-layout sign-off step 114. Test patterns can then be generated in an automatic test pattern generation (ATPG) step 116, and the final layout design can then be manufactured.

The existing top-down design methods not only suffer from the defective interconnect model mentioned above, but also from the long elapsed time between optimization cycles. With each optimization cycle, the logic synthesis, circuit partitioning, placement and routing are "point" tools, each operating on the entire design. Such loose coupling between tools in this optimization cycle is inefficient, since the steps towards convergence to an optimized layout tend to be small for each optimization cycle. For example, any possible improvement realizable by resynthesis of the logic circuit that arises because of a different placement of cells cannot be taken advantage of until the next optimization cycle. Furthermore, at the current and future circuit densities, the amount of CPU cycles used in each point tool in the optimization cycle is enormous, with many cycles expended in repeating tasks also performed in the previous optimization cycles. Further, since each existing point tool is typically acquired from a different vendor, there is substantial inefficiency in the interface between point tools. Typically, each point tool reads into memory a large data file provided by an upstream point tool, and provides its results in another large data file to be read by a downstream point tool.

The long optimization cycles can be alleviated somewhat by the use of parallel point tools. An example of such a parallel point tool is disclosed in U.S. Pat. No. 5,495,419 to Rostoker et al., entitled "INTEGRATED CIRCUIT PHYSICAL DESIGN AUTOMATIC SYSTEM UTILIZING OPTIMIZATION PROCESS DECOMPOSITION AND PARALLEL PROCESSING," issued Feb. 27, 1996. In Rostoker et al, a parallel placement algorithm is executed by parallel processors, thereby shortening the time to achieve the placement function.

Thus, a method is desired for optimizing the integrated circuit design process, which both takes advantage of parallel algorithms and closely couples the layout design tasks in the optimization cycle is desired.

SUMMARY OF THE INVENTION

The present invention provides a method for optimizing a layout design, which minimizes the optimization cycle by incorporating interconnect wiring delays and performing logic optimization in the placement and routing operations. In one embodiment of the present invention, the method includes the steps of: (a) partitioning circuit elements of the layout design into clusters; (b) mapping a portion of the layout design to each cluster, so as to obtain a first placement; (c) providing routing between circuit elements within each cluster and between circuit elements of different clusters; (d) performing a timing analysis to provide estimates of interconnect delay between circuit elements within each cluster and between circuit elements of different clusters; (e) performing a logic optimization operation on a selected one of the clusters to obtain a second gate-level design based on a cost function. The steps (a)–(e) are reiterated until the cost function becomes less than a predetermined threshold. The clustering of circuit elements allow circuit elements having high connectivity amongst them to be kept together and thus placed in close proximity of each other, while minimizing inter-cluster interconnect wiring delays.

In that embodiment, the method is iterated over an outer-loop in which each iteration divides each cluster into smaller subclusters and applies steps (b) through (f) on the subclusters until the subcluster includes only primitive circuit elements.

In one embodiment, the logic optimization operation, which is performed concurrently with the placement and routing operations, (i) reassigns circuit elements between clusters, (ii) inserts or deletes signal buffers between circuit elements (iii) synthesizes alternative implementations of logic functions.

The method of the present invention can be implemented in a parallel processing design automation system to achieve high performance. Such a parallel processing system includes (a) multiple central processing units (CPUs) executing independently of each other; (b) a shared memory accessible by each CPU for holding data structures of the integrated circuit design; and (c) a control program managing a task list which specifies tasks for optimizing the integrated design. The control program assigns tasks on the task list to each of the CPUs. The tasks include placement, performance analysis, logic optimization and routing. The control program provides a locking mechanism for locking data structures stored in the shared memory to support concurrent operations by the CPUs each accessing the integrated circuit design represented by the data structures. Further, the parallel processing design automation system supports multithread execution. Parallelism is further enhanced by adopting algorithms for placement, timing analysis, logic optimization and routing suitable for parallel execution by the multiple CPUs each accessing the design data structures stored in the shared memory.

The present invention is better understood upon consideration of the detailed description below in conjunction with the accompanying drawings.

DETAILED DESCRIPTION OF THE PREFERRED EMBODIMENTS

Figure 1:
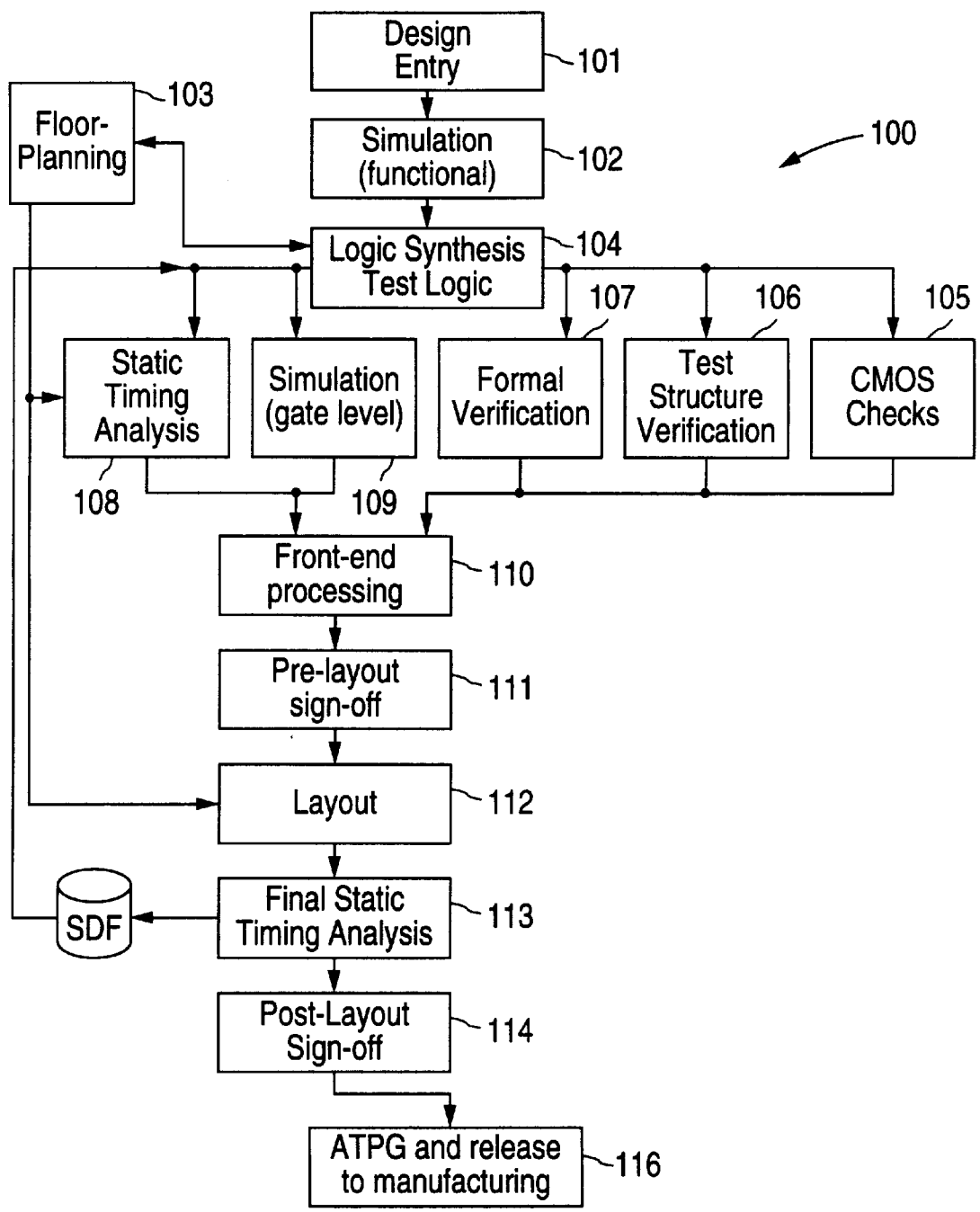
FIG. 1 shows an existing method 100 for designing an integrated circuit in the prior art.

The present invention provides a performance-driven method for designing an integrated circuit, which can be used in conjunction with a parallel processing computer system. To simplify discussion and to facilitate cross reference among the figures, like elements in the figures are given like reference numerals.

Figure 2:
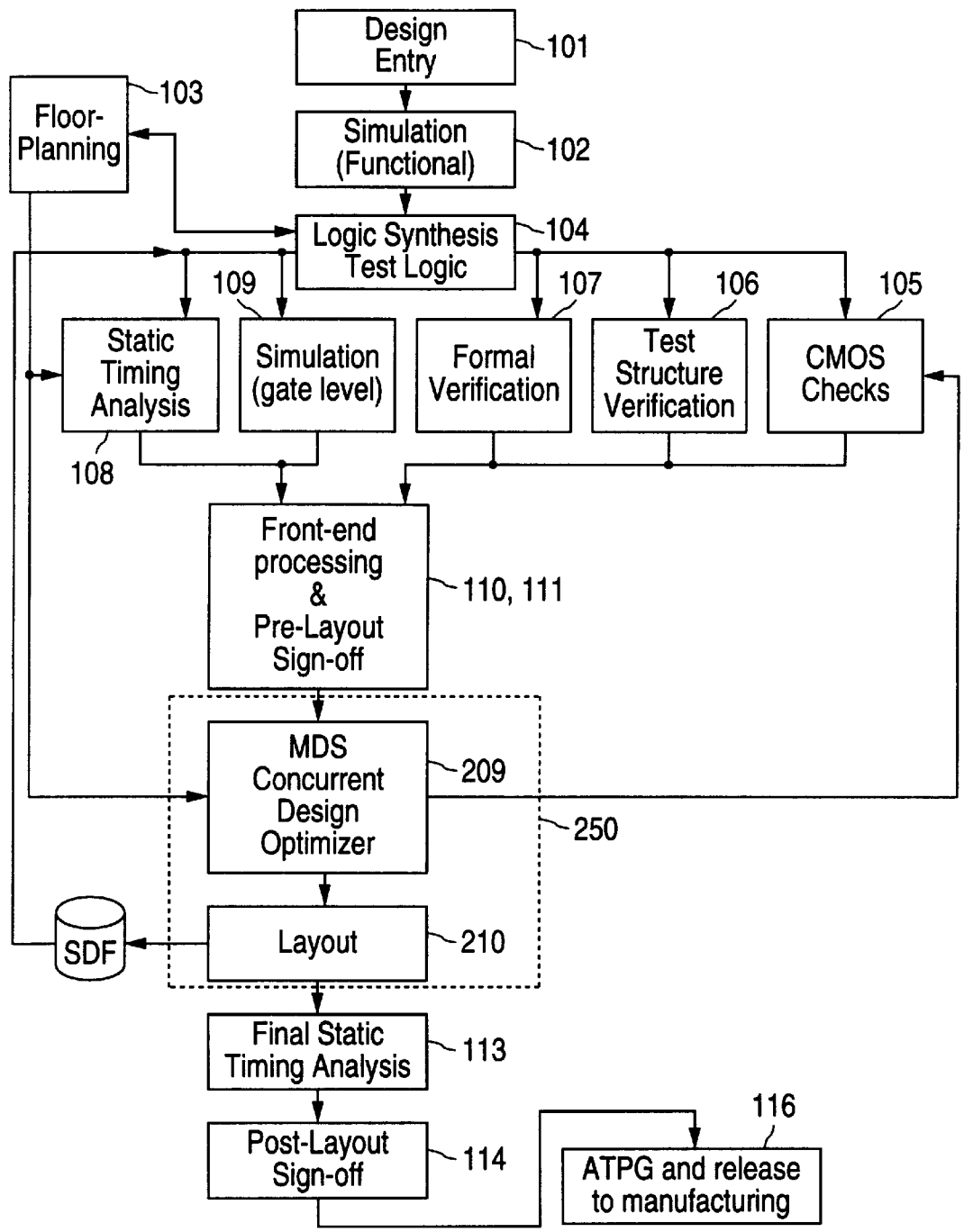
FIG. 2 shows a method 200 for designing an integrated circuit in one embodiment of the present invention.

One embodiment of the present invention is a design method 200 illustrated in FIG. 2. As shown in FIG. 2, method 200 includes design entry step 101, functional simulation step 102, logic synthesis step 104, floor-planning step 103, technology checking step 105, formal verification step 107, test structure verification step 106, timing analysis step 108, gate-level simulation step 109, front-end processing and pre-layout signoff steps 110, 111 substantially in the same conventional manner as those steps of like reference numerals illustrated in FIG. 1 and discussed in the previous section. Method 200, however, synthesizes layout using a novel concurrent design optimization step 209, which performs in parallel placement, logic optimization and routing functions driven by concurrent timing and power analyses. Design optimization step 209, discussed in further detail in the following, provides a layout (generated at layout step 210) which is substantially optimized for power and timing. Accordingly, in method 200, the number of iterations through the optimization cycle of steps 104–111, 209 and 210 is substantially less than corresponding optimization cycle of steps 104–113 of method 100 illustrated in FIG. 1. When the designer is satisfied with the layout design, final timing analysis step 113, post-layout sign-off step 114 and ATPG step 116 can be performed in the conventional manner.

Figure 3:
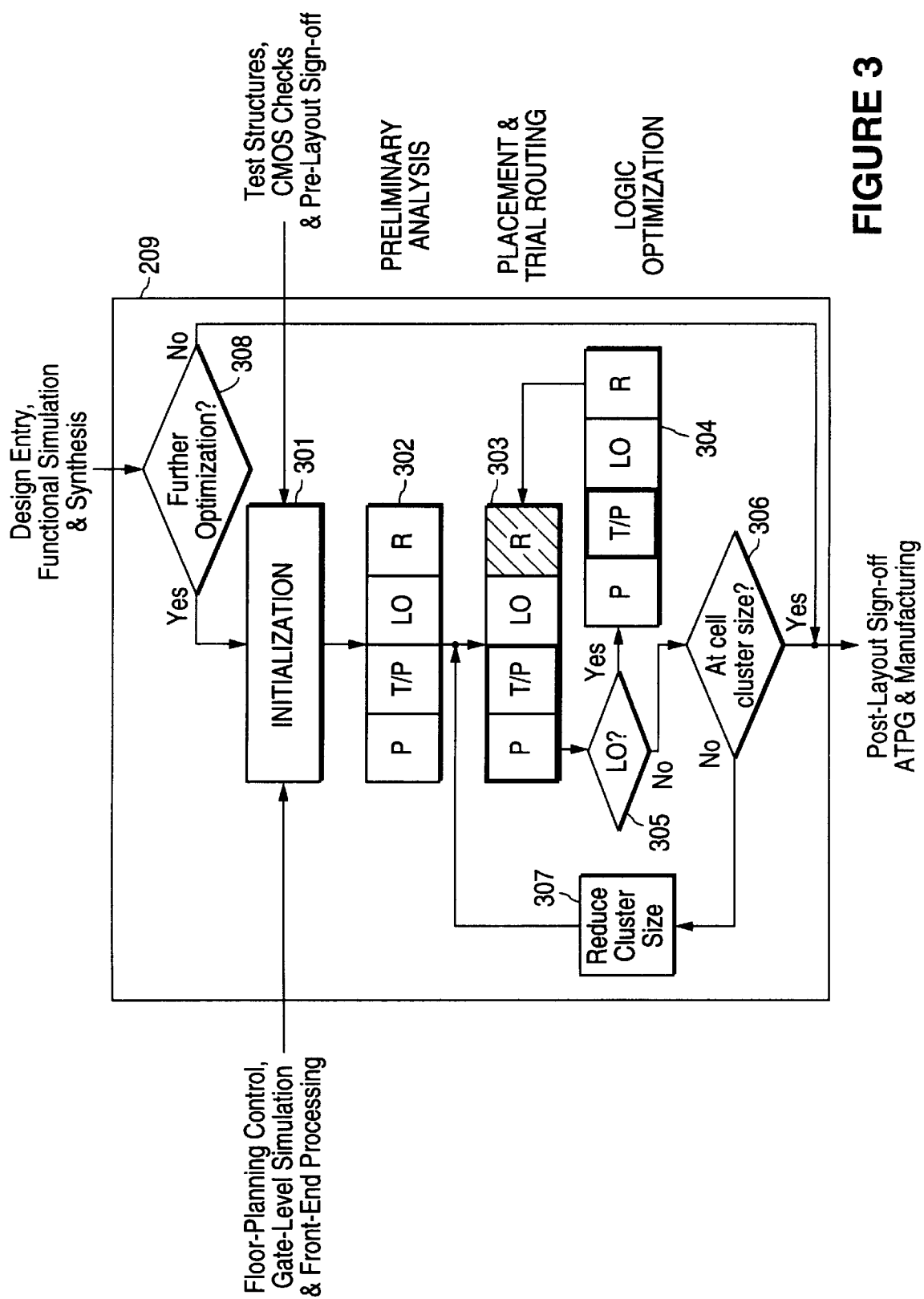
FIG. 3 shows in further detail design optimization step 209 of FIG. 2.
Figure 4:
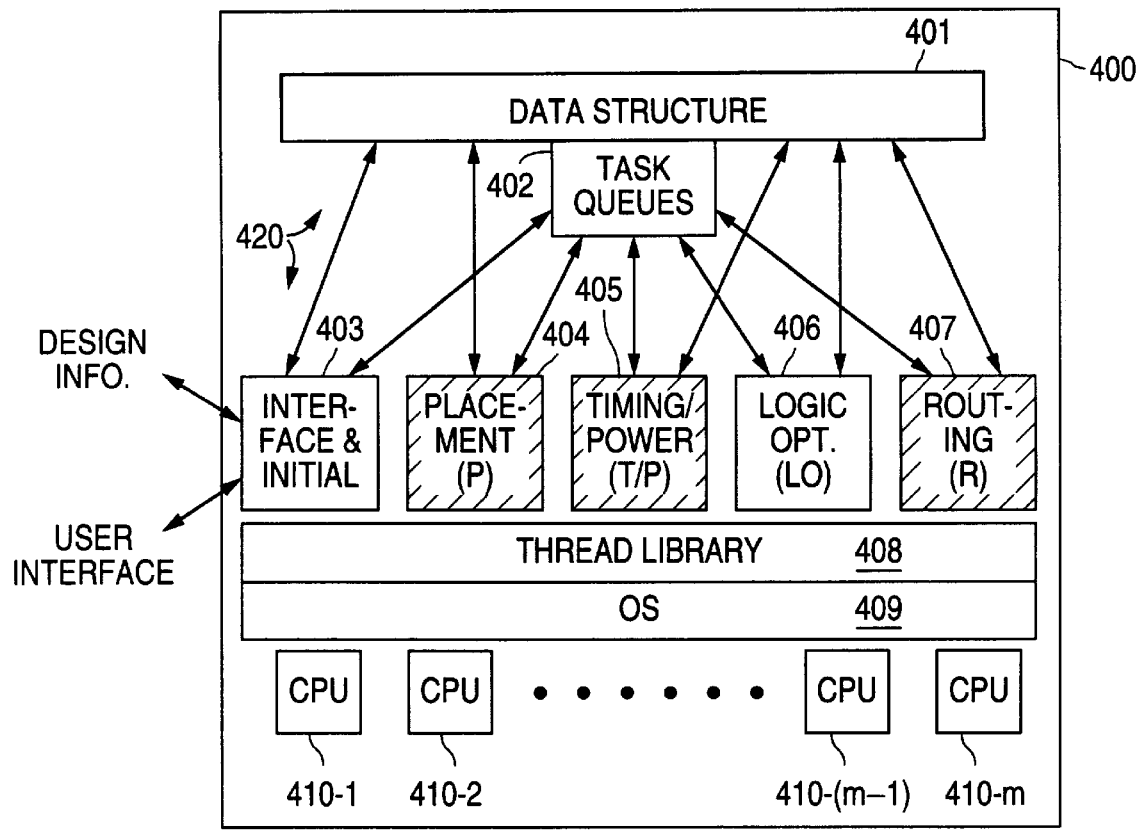
FIG. 4 shows a parallel processing computer system 400, suitable for implementing a concurrent design optimizer of the present invention.

Concurrent design optimization step 209, which is illustrated in further detail in FIG. 3, can be carried out in a parallel processing computer system ("concurrent design optimizer") having an architecture provided, for example, in FIG. 4.

In FIG. 3, a gate-level design, which can be provided in the form of an industry standard "netlist", is received at the beginning of concurrent design optimization step 209. This gate-level design, which results from a logic synthesis step (e.g., logic synthesis step 104) is then examined to determine if further optimization of the design is required. Typically, the designer indicates whether such optimization is required when invoking the concurrent design optimizer. If design constraints have not been met, i.e., further optimization is required, an initialization step (i.e., initialization step 301) is performed.

Initialization step 301 groups the elements of the netlist into clusters. Each cluster is so grouped as to allow highly connected elements to be placed in close proximity. The goal of such clustering is such that circuits within a cluster are tightly coupled and circuits from different clusters are loosely coupled. Proper clustering of the netlist improves performance of the subsequent placement step by reducing the search space.

Upon completing initialization step 301, a preliminary placement and routing estimation step 302 is performed. Initial placement and routing estimation step 302 (a) maps the clusters into an initial set of partitions ("initial placement"), (b) performs an initial timing and power analysis based on the initial placement, (c) optimizes the initial placement according to a given set of cost functions, and (d) provides an initial routing or an initial set of routing estimates. In addition, a logic optimization step can also be carried out to further improve performance. Suitable logic optimization step includes providing alternative implementations of logic circuits, and insertion or deletion of signal buffers. At this level, as clusters are loosely coupled, significant parallelism can be exploited by a parallel processing computer system, such as computer system 400 of FIG. 4, which is discussed in further detail below. In one embodiment, the available space in the layout is divided into regions ("bins"), and placement of each cluster is achieved by associating the cluster with a specific bin.

Having provided an initial placement by initial placement and routing or routing estimate step 302, an iterative process involving an "inner" loop and an "outer" loop is carried out to further refine the design optimization process. Each iteration of the outer-loop reduces the size of each cluster, until the level of individual cells (e.g., logic gates or macrocells) is reached. In addition, each bin can be further partitioned into smaller bins to refine the granularity of the placement.

In the inner-loop, a placement and routing estimate step 303 (a) places the gates in each current cluster into the current set of bins in the physical layout, the current clusters being either the clusters of the initial placement or clusters from the previous outer-loop iteration; (b) providing routing or routing estimates based on the current placement; (c) analyzes timing, routing density and power attributes of this new placement to obtain performance metrics; (d) perform logic optimization on the current placement based on the performance metrics obtained, to obtain an improved gate-level design; and (e) providing an improved set of clusters. As represented by placement and routing or routing estimate step 304, steps (a)–(d) of placement and routing estimate steps 303 can be repeated to provide further placement optimization, given the current cluster size. Placement optimization step (a) can be carried out using a variety of techniques, such as various annealing techniques, or genetic algorithms. Logic optimization step (c) is performed to synthesize variations of the logic circuits within each cluster, based on which further placement optimization are possible. Step 304 is repeated until some performance constraints are met, e.g., the expected performance gain falls below a threshold metric.

At this point, if the current clusters are not reduced to primitives (e.g., a library cell), a cluster size reduction step 307 divides the current clusters into smaller clusters, and initiates the inner-loop placement and routing or routing estimate steps 303 and 304 in the manner described above, until the clusters become primitives. Then, conventional final timing analysis, post-layout sign-off and ATPG steps 113–116 can be performed.

Because an integrated circuit layout design created from an initial netlist using the method described above, in which placement, routing or routing estimates and logic optimization are performed at every level of cluster refinement, the resulting integrated circuit is expected to be significantly different in organization from an integrated circuit created from the same initial netlist but refined by conventional partitioning, placement and global routing performed in the manner shown in FIG. 1. For a given gate-level logic netlist, certain optimizations in the layout design attainable using the methods of the present invention are unattainable using conventional serially applied partitioning, placement and global routing methods. FIGS. 5(a)–5(c) and FIGS. 6(a)–6(b) provide two examples to illustrate the effects of concurrent placement, routing and logic optimization on integrated circuit designed under the present invention.

Figure 5A:
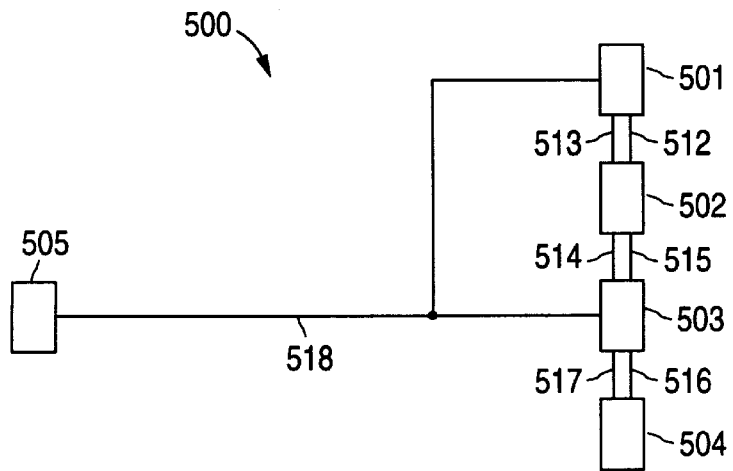
FIG. 5(a) shows circuit 500 including circuit elements 501–505 interconnected by nets 512–517.

As shown in FIG. 5(a), a circuit 500 includes circuit elements 501–505 which are interconnected by nets 512–517. In circuit 500, net 518 represents a portion of a "critical" path (i.e., a signal path in which strict timing constraints must be met) which includes circuit elements 505 and 503. Logic element 501, however, is not part of the critical path. Thus, many optimization techniques would tend to move circuit elements 505 and 503 closer together to reduce the total wire length of net 518, hence reducing the interconnect delay.

Figure 5B:
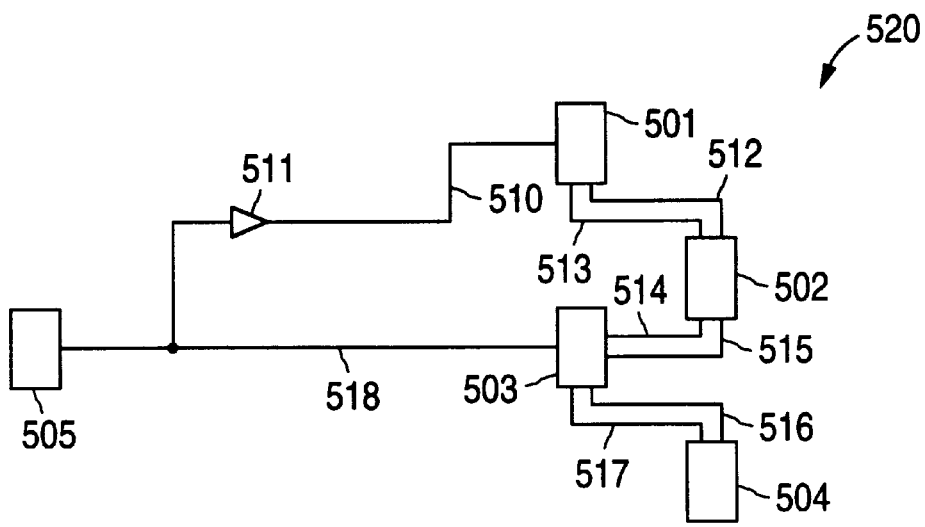
FIG. 5(b) shows circuit 520 after placement, routing and logic optimization steps performed under the prior art.

The prior art technique illustrated by FIG. 1 would provide a circuit implementation such as circuit 530 shown in FIG. 5(b). To reduce the wiring length in net 518, a placement tool would move circuit elements 501, 503 and 505 closer together, as shown in FIG. 5(b). Subsequently, a routing tool provides the wiring of nets 512–517, as shown. However, a subsequent timing analysis would discover that the shorter wire length would still be insufficient to satisfy the strict timing constraints of net 518. Accordingly, an optimization step after the timing analysis would insert buffer 511 between logic elements 505 and 501, thereby reducing the capacitance of net 518 and introducing a new net 510 in this non-critical portion of net 518. However, because logic elements 501 and 503 are moved closer to logic element 501, the interconnect wiring in nets 512–517 amongst logic elements 501–504 are consequently lengthened, thereby incurring a penalty in circuit area and routing congestion.

Figure 5C:
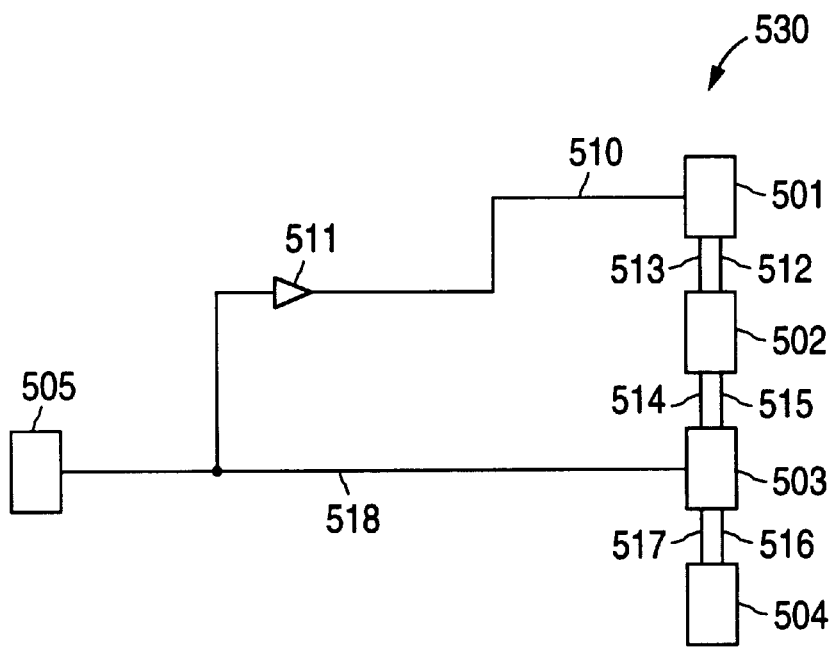
FIG. 5(c) shows circuit 550 after placement, routing and logic optimization steps performed under the present invention.

Because of the iteration in the inner-loop, however, the present invention would provide an implementation such as circuit 530 shown in FIG. 5(c). During iteration in the inner-loop, the logic optimization step in the inner-loop would recognize hat inserting buffer 511 would satisfy the timing constraints in net 518, before the placement step in the next iteration in the inner-loop, thus preserving both the initial placement of logic elements 501–504 and the wiring in nets 512–517.

Figure 6A:
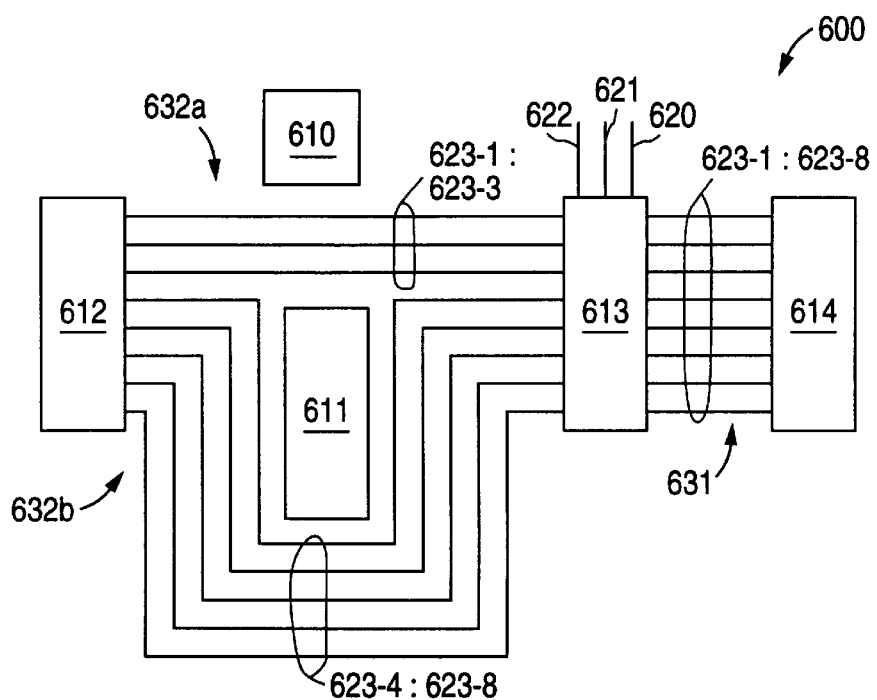
FIG. 6(a) shows circuit 600 placed and routed in accordance with methods in the prior art.
Figure 6B:
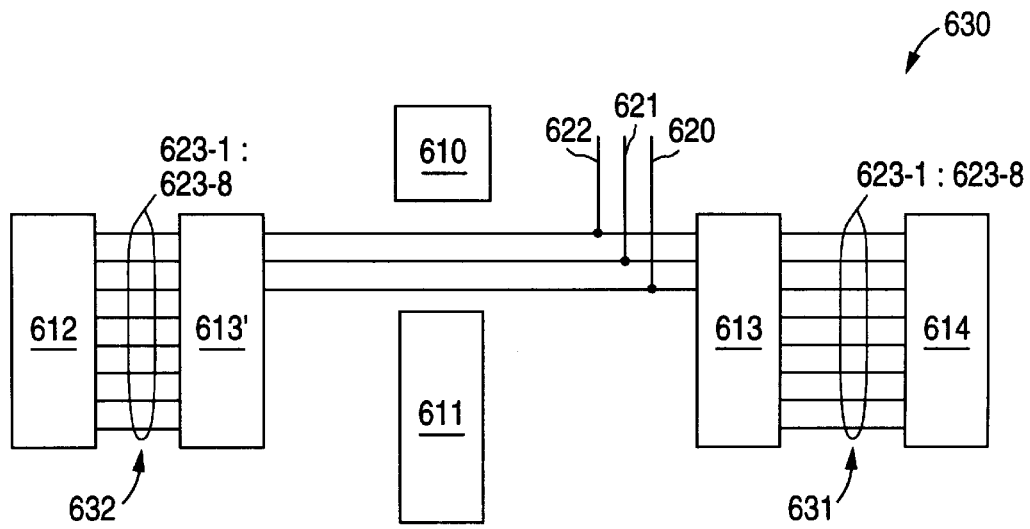
FIG. 6(b) shows circuit 630 placed, routed and logic optimized in accordance with one embodiment of the present invention.

A second example to illustrate the effects of the present invention on integrated circuit design is provided in FIGS. 6(a) and 6(b). FIG. 6(a) shows a circuit 600, which includes circuit elements 610–614. Circuit element 613 includes a decoder which receives encoded signals 620 to 622, and decodes these signals into signals 623-1 to 623-8. Signals 623-1 to 623-8 are provided to circuit elements 612 and 614. Under the prior art placement and routing methods, a placement tool provides placement of circuit elements 610 to 614, as shown. Subsequently, a routing tool provides (a) between decoder 613 and 614, wires 631 for signals 623-1 to 623-8, (b) between decoder 613 and circuit element 612, wires 632a for signals 623-1 to 623-3 in the channel between circuit elements 610 and 611, and (c) between decoder 613 and circuit element 612, wires 623b for signals 623-4 to 623-8 around circuit element 611. As shown in FIG. 6(*a*), because placement optimization and routing are only loosely coupled, the placement of circuit elements 610 and 611 allows only three of the eight decoded signals 623-1 to 623-8 to be routed in the narrow channel between circuit elements 610 and 611. The remaining decoded signals must be routed around circuit element 611, thus increasing chip area, and causing signal congestion, timing and power dissipation inefficiencies.

In contrast, under the present invention, during iteration in the inner-loop, the placement and logic optimization steps would provide an additional decoder 613', as shown in circuit 630 of FIG. 6(*b*). Signals 623-1 to 623-8 can thus be provided to circuit element 612 from additional decoder 613'. As shown in FIG. 6(*b*), relatively short wires 632 and 631 provide signals 623-1 to 623-8 circuit elements 612 and 614, respectively. Further, the relatively narrow channel between circuit elements 610 and 611 is now used to route encoded signals 620 to 622 to decoders 613 and 613'. Clearly, if decoder 613' occupies an area smaller than that occupied by wires 623b, circuit 630 of FIG. 6(*b*) is more efficient in silicon real estate, timing and power dissipation than circuit 600 of FIG. 6(*a*). Additional decoder 613' could not have been added under the prior art methods, since there is no room which can be allocated to place an additional decoder.

FIG. 4 shows a parallel processing system 400 suitable for implementing a concurrent design optimizer of the present invention. As shown in FIG. 4, parallel processing computer system 400 includes a shared memory 420 and a large number of central processing units (CPUs) 410-1, 410-2, 410-3, . . . 410-(m-1) to 410-m. Provided in shared memory 420 is an operating system 409 which can be executed on each of CPUs 410-1 to 410-m. A thread library 408 provides the control programs for executing multiple concurrently executed threads on operating system 409. The concurrent design optimizer provides data structure 401, representing the design to be optimized, in shared memory 420. Also residing in shared memory 420 are (a) interface and initialization module 403, representing the programs for interface with the design database and a user interface, (b) placement module 404, representing the programs for placement of clusters and for placement optimization; (c) timing/power analysis module 405, representing programs for incremental timing and power analysis steps, (d) logic optimization module 406, representing programs for optimizing a logic circuit, and (e) routing or routing estimation module 407, representing programs for routing and estimating use of routing resources. Alternatively, each CPU can have its own copy of modules 403–407, residing either in shared memory 420 or in a memory to which the CPU has exclusive access (e.g., a private address space).

The algorithms used in the methods described above (e.g., those used in the placement and routing or routing estimate steps 303 and 304 discussed above in conjunction with method 300 of FIG. 3) can be efficiently executed in parallel. For example, since each of the placement, placement optimization steps, routing and routing estimation, logic optimization, incremental timing and power analysis steps described above operate on at most a few clusters at a time, and since the design includes a large number of groups of clusters, each group involving a small number of clusters can be handled by a different independently executing thread. Each thread can begin execution in any of CPUs 410-1 to 410-m. Communication within the modules executing within a thread, or between modules executing on different threads can be achieved by a task queue 402. For example, upon completion of a placement of gates into the lower level clusters, a placement program of placement module 404 running in a thread can create a task in task queue 402, pointing to a new placement for the thread's assigned clusters in data structure 401. Upon initialization, a program in timing and power analysis module 405 then accesses task queue 402 to find the task left by the previous placement program and proceeds to perform timing and power analysis on the new placement. To assure data integrity and concurrency under such a highly parallel system, a locking mechanism can be provided to prevent accidental write access by multiple threads to the same data structure (e.g., a cluster). Since granularity of such data structure is small, and the number of such data structures is enormous, the probability of concurrent access by multiple threads to the same data object is small. When multiple threads attempts to access the same data object, a simple resolution mechanism which grants access to one thread and queues accesses by the other threads would suffice.

A CPU, such as any of CPUs 410-1 to 410-m, would be configured to run any of the programs in modules 403–407, and would be controlled by an operating system which provides services for creating and executing in a thread using programs in thread library 408. In addition, the CPU would maintain processes which handle reading tasks from and writing tasks to task queue 402, and reading data from and writing data to data structure 401 which includes the design data of the integrated circuit under design. CPUs 410-1 to 410-m can be implemented, for example, by a group of high-performance microprocessors, or a group of engineering design workstations.

The above detailed description is provided to illustrate the specific embodiments of the present invention and is not intended to be limiting. Numerous modifications and variations within the scope of the present invention are possible. The present invention is defined by the following claims.

We claim:

1. A method for optimizing a layout design based on a first gate-level design, comprising:
    (a) partitioning circuit elements of said first gate-level design into a first plurality of clusters;
    (b) mapping each cluster to a portion of said layout design so as to obtain a placement;
    (c) based on said placement, providing routing or routing estimates between circuit elements of each cluster and between circuit elements of different clusters;
    (d) based on said routing or routing estimates, performing a timing analysis to provide estimates of interconnect delays between circuit elements within each cluster and between circuit elements of different clusters;
    (e) performing a logic optimization operation on a selected one of said clusters to obtain a second gate-level logic design based on a cost function, said cost function being a function of said estimates of interconnect delays;
    (f) partitioning said second gate-level logic design to obtain a second plurality of clusters; and
    (g) repeating (b)–(f) until said cost function is less than a predetermined value.

2. A method as in claim 1, further comprising:
dividing each cluster into a plurality of subclusters; and
applying (b) through (f) on the subclusters.

3. A method as in claim 2, wherein said dividing step and said applying step are recursively applied to said subclusters until said subcluster include only primitive circuit elements.

4. A method as in claim 1, further comprising a placement optimization operation which reassigns circuit elements in a selected cluster to a second cluster mapped to a portion of said layout design adjacent the portion of said layout design mapped to said selected cluster.

5. A method as in claim 1, wherein said logic optimization operation inserts or deletes buffers between circuit elements.

6. A method as in claim 1, wherein said logic optimization operation provides one of several logic circuits performing substantially the same logic function.

7. A method as in claim 1, wherein said plurality of clusters are grouped into a plurality of cluster groups and wherein each of said mapping step, said performing a timing analysis step, said performing a logic optimization operation step and said routing step is applied concurrently to each cluster group using multiple processing units.

8. A method as in claim 1, wherein said clusters are divided so that connectivity amongst elements within a cluster are higher than connectivity amongst elements of different clusters.

9. A method as in claim 1, wherein said circuit elements are provided in a logic net list.

10. A method as in claim 1, further providing an initialization step which includes in said layout design test structures.

11. A method for designing an integrated circuit, comprising:
(a) providing a register-transfer level logic design of said integrated circuit;
(b) performing a functional simulation of said logic circuit;
(c) using a logic synthesis tool, synthesizing a gate-level logic design of said integrated circuit from said register-transfer level logic design of said integrated circuit;
(d) using a timing model, performing a static timing analysis of said gate-level logic design;
(e) placing said gate-level logic design into a first placement representing mappings of circuit elements of said gate-level logic design to physical locations of said integrated circuit, said placing step including interconnect delay-driven circuit placement and logic optimization steps;
(f) extracting from said mappings of circuit elements values of timing parameters of said timing model and updating said timing model;
(g) providing a physical design based on said mappings of circuit elements;
(h) extracting from said physical design and resynthesizing using said logic synthesis tool a second gate-level logic circuit and updating said timing model
(i) repeating (d) to (h) according to a cost function, until such cost function attains value less than a predetermined value; and
(j) performing a final static timing analysis to verify that timing goals are met.

12. A method as in claim 11, wherein (e) comprises:
(a1) partitioning circuit elements of said layout design into a plurality of clusters;
(b1) mapping each cluster to a portion of said layout so as to obtain a placement;
(c1) based on said placement, providing routing or routing estimates for circuit elements within each cluster and between circuit elements of different clusters;
(d1) performing a timing analysis to provide estimates of interconnect delay between circuit elements within each cluster and between circuit elements of different clusters;
(e1) performing a logic optimization operation on a selected one of said clusters to obtain a second gate-level logic design based on a cost function, said cost function being a function of said estimates of interconnect delays;
(f1) based on said second gate-level logic design, providing an improved plurality of clusters; and
(g1) repeating (b1)–(f1) until said cost function is less than a predetermined value.

13. A method as in claim 12, further comprising:
dividing each cluster into a plurality of subclusters; and
applying (b1) through (g1) on the subclusters.

14. A method as in claim 13, wherein said dividing step and applying step are recursively applied to said subclusters until said subcluster include only primitive circuit elements.

15. A method as in claim 12, further comprising a placement optimization operation which reassigns circuit elements in a selected cluster to a second cluster mapped to a portion of said layout design adjacent the portion of said layout design mapped to said selected cluster.

16. A method as in claim 12, wherein said logic optimization operation inserts or deletes buffers between circuit elements.

17. A method as in claim 12, wherein said logic optimization operation provides one of a plurality of logic circuits performing substantially the same logic function.

18. A method as in claim 12, wherein said plurality of clusters are grouped into a plurality of cluster groups and wherein each of said mapping step, said performing a timing analysis step, said performing a logic optimization operation step and routing step is applied concurrently to each cluster group using multiple processing units.

19. A method as in claim 12, wherein said clusters are divided so that connectivity amongst elements within a cluster are higher than connectivity amongst elements of different clusters.

20. A method as in claim 12, wherein said circuit elements are provided in a logic net list.

21. A method as in claim 12, further providing an initialization step which includes in said layout design test structures.

22. A method as in claim 12, wherein said logic optimization operation reassigns circuit elements in a selected cluster to a second cluster mapped to a portion of said layout design adjacent the portion of said layout design mapped to said selected cluster.

23. A parallel processing design automation system for optimizing an integrated circuit design, comprising:
a plurality of central processing units;
a memory for holding said integrated circuit design, said memory being accessible by each central processing units;
a control program managing a task list, said task list specifying tasks for optimizing said integrated circuit design, said control program allocating each of said tasks in said task list to said central processing units said, control program supporting multithread execution;

wherein each said task is one of placement, performance analysis, logic optimization and routing;

wherein said control program provides a locking mechanism for data structures stored in said memory to support concurrent operations by said central processing units each accessing said integrated circuit design represented by said data structures.

24. A parallel processing design automation system as in claim 23, further configured to include a placement program based upon an algorithm capable of parallel execution by said central processing units accessing said data structures.

25. A parallel processing design automation system as in claim 23, further configured to include a timing analysis program based upon an algorithm capable of parallel execution by said central processing units accessing said data structures.

26. A parallel processing design automation system as in claim 23, further configured to include a logic optimization program based upon an algorithm capable of parallel execution by said central processing units accessing said data structures.

27. A parallel processing design automation system as in claim 23, further configured to include a routing or routing estimation program based upon an algorithm capable of parallel execution by said central processing units accessing said data structures.

28. An integrated circuit having a layout design created by a process comprising:
(a) partitioning circuit elements of a first gate-level logic design into a plurality of clusters;
(b) mapping each cluster to a portion of said layout design so as to obtain a placement;
(c) based on said placement, providing routing or routing estimates between circuit elements of each cluster and between circuit elements of different clusters;
(d) based on said routing or routing estimates, performing a timing analysis to provide estimates of interconnect delays between circuit elements within each cluster and between circuit elements of different clusters;
(e) performing a logic optimization operation on a selected one of said clusters to obtain a second gate-level logic design based on a cost function, said cost function being a function of said estimates of interconnect delays;
(f) partitioning said second gate-level logic design to obtain a second plurality of clusters; and
(g) repeating (b)–(f) until said cost function is less than a predetermined value.

29. An integrated circuit as in claim 28, said layout design being created by applying further:
dividing each cluster into a plurality of subclusters; and
applying (b) through (f) on the subclusters.

30. An integrated circuit as in claim 29, wherein said dividing step and applying step are recursively applied to said subclusters until said subcluster include only primitive circuit elements.

31. An integrated circuit as in claim 28, further comprising a placement optimization operation which reassigns circuit elements in a selected cluster to a second cluster mapped to a portion of said layout design adjacent the portion of said layout design mapped to said selected cluster.

32. An integrated circuit as in claim 28, wherein said logic optimization operation inserts or deletes buffers between circuit elements.

33. An integrated circuit as in claim 28, wherein said logic optimization operation provides one of a plurality of logic circuits performing substantially the same logic function.

34. An integrated circuit as in claim 28, wherein said plurality of clusters are grouped into a plurality of cluster groups and wherein each of said step mapping step, said performing a timing analysis step, said performing a logic optimization operation step and said routing step is applied concurrently to each cluster group using multiple processing units.

35. An integrated circuit as in claim 28, wherein said clusters are divided so that connectivity amongst elements within a cluster are higher than connectivity amongst elements of different clusters.

36. An integrated circuit as in claim 28, wherein said logic optimization operation reassigns circuit elements in a selected cluster to a second cluster mapped to a portion of said layout design adjacent the portion of said layout design mapped to said selected cluster.

37. A computer system coupled to a shared memory accessible to a plurality of computer systems, comprising:
a central processing unit;
an operation system which provides services for creating and executing multiple threads;
an interface to said shared memory, said interface reading tasks from and writing tasks to a task queue residing in said shared memory, and reading from and writing to design data of an integrated circuit residing in said shared memory;
a memory containing application programs for processing said design data read from said shared memory and writing back said processed design data to said shared memory through said interface;
wherein said applications programs include programs for performing in a method for optimizing a layout design based on a gate-level design:
(a) partitioning circuit elements of said layout design into a plurality of clusters;
(b) mapping each cluster to a portion of said layout design so as to obtain a placement;
(c) based on said placement, providing routing or routing estimates between circuit elements of each cluster and between circuit elements of different clusters;
(d) based on said routing or routing estimates, performing a timing analysis to provide estimates of interconnect delays between circuit elements within each cluster and between circuit elements of different clusters;
(e) performing a logic optimization operation on a selected one of said clusters to obtain a second gate-level logic design based on a cost function, said cost function being a function of said estimates of interconnect delays;
(f) based on said second gate-level logic design, providing an improved plurality of clusters; and
(g) repeating (b)–(f) until said cost function is less than a predetermined value.

38. A computer system as in claim 37, said method further comprising:
dividing each cluster into a plurality of subclusters; and
applying (b) through (f) on the subclusters.

39. A computer system as in claim 38, wherein said dividing step and applying step are recursively applied to said subclusters until said subcluster include only primitive circuit elements.

* * * * *